Patented Aug. 25, 1925.

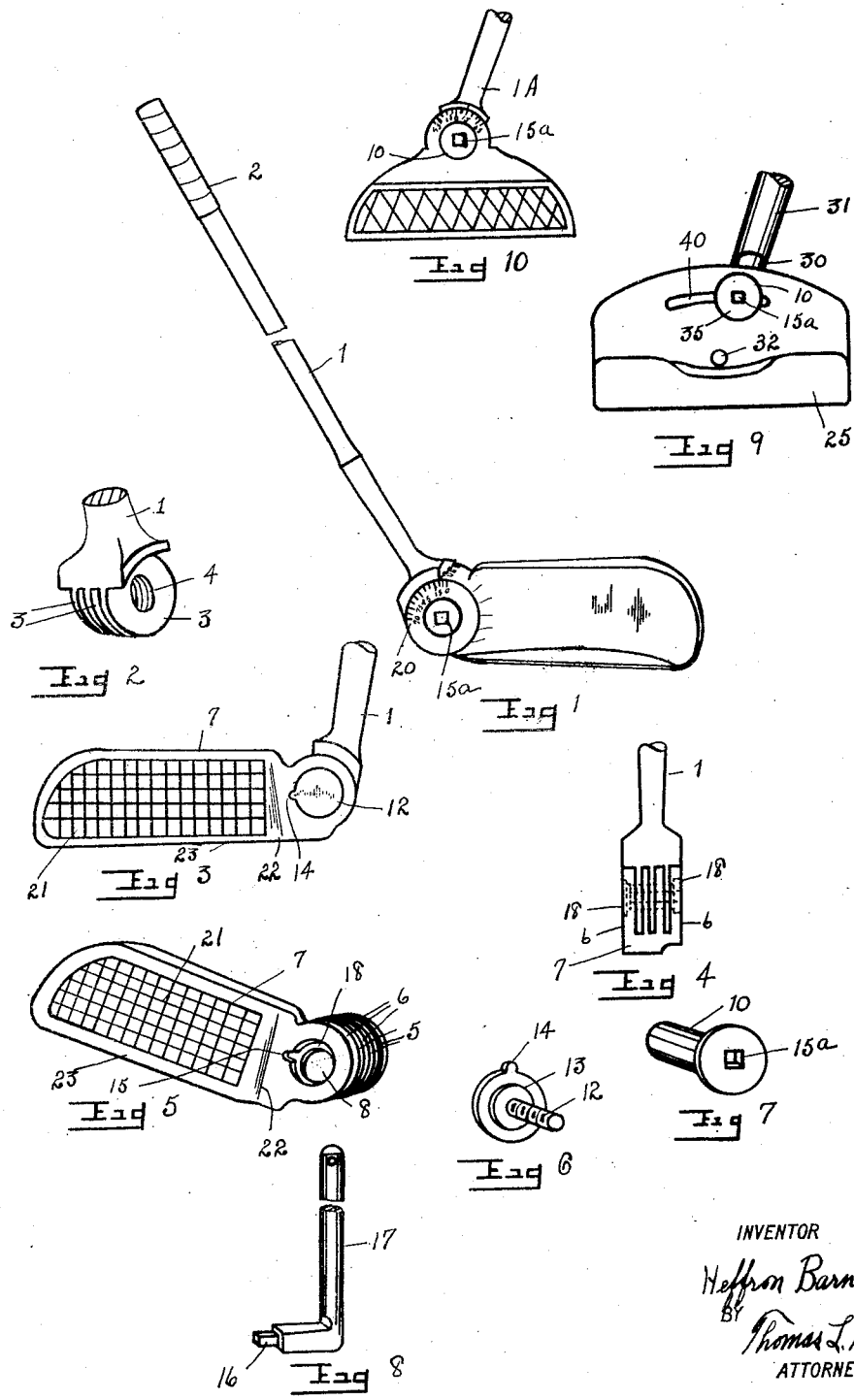

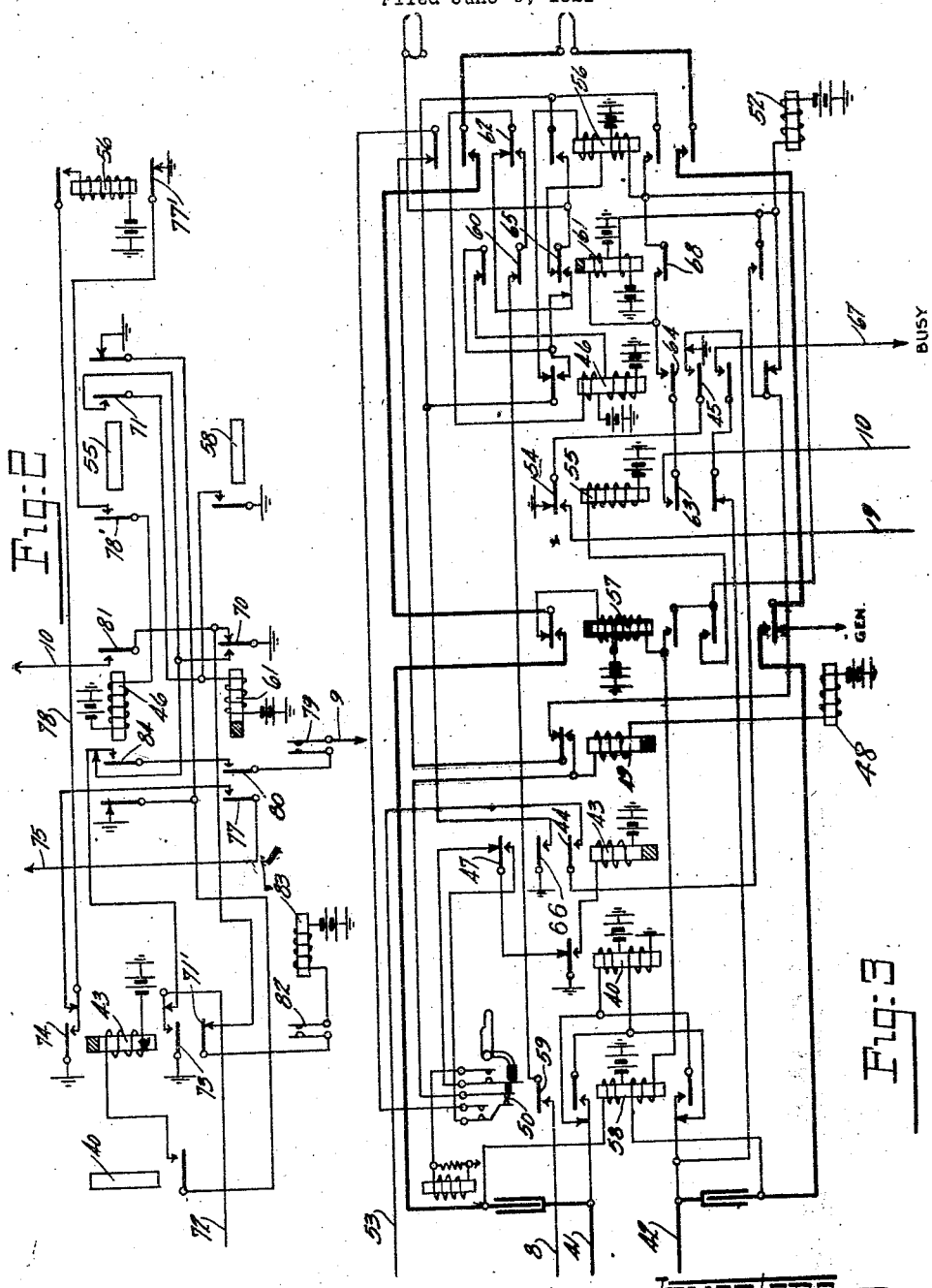

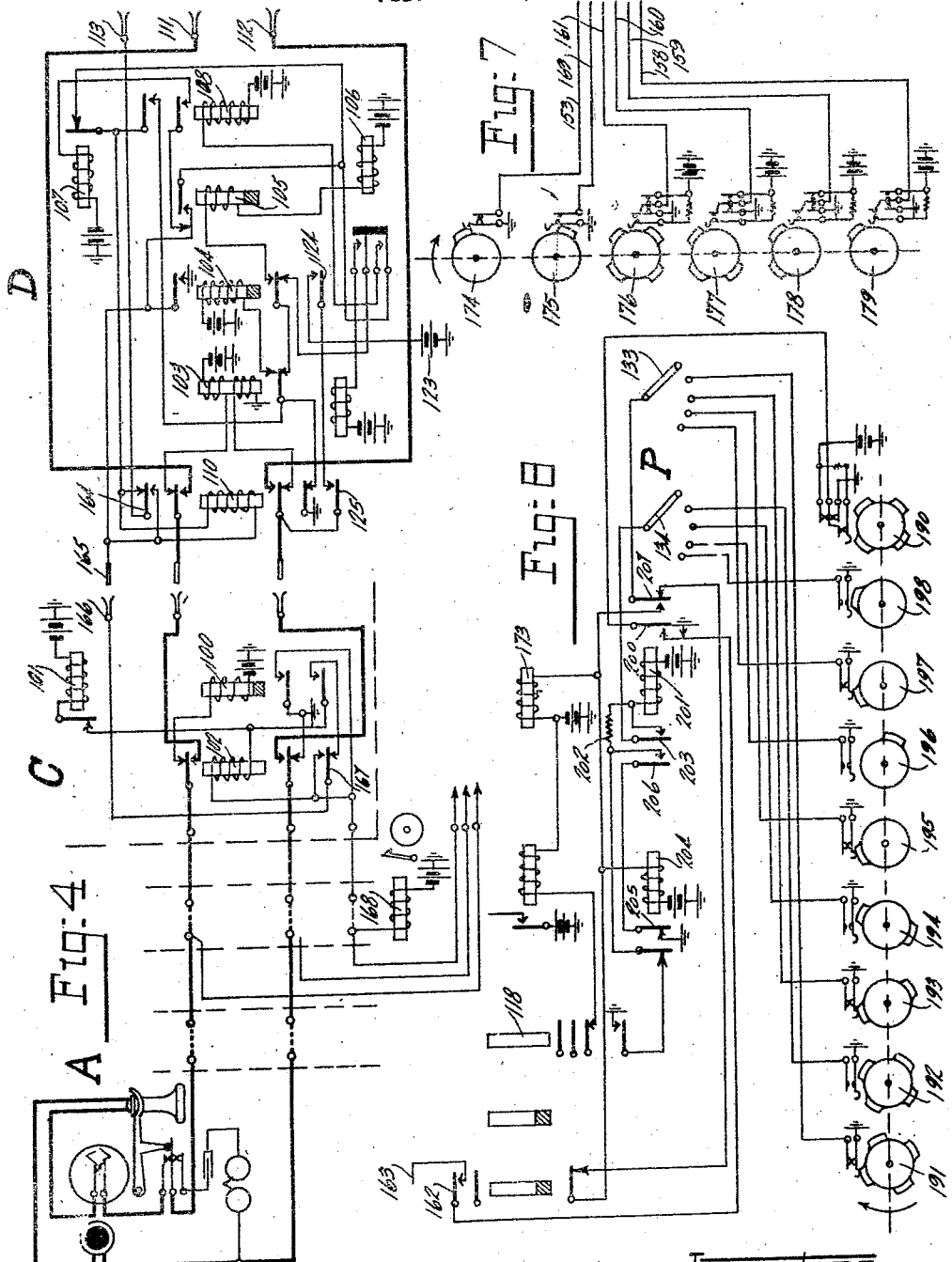

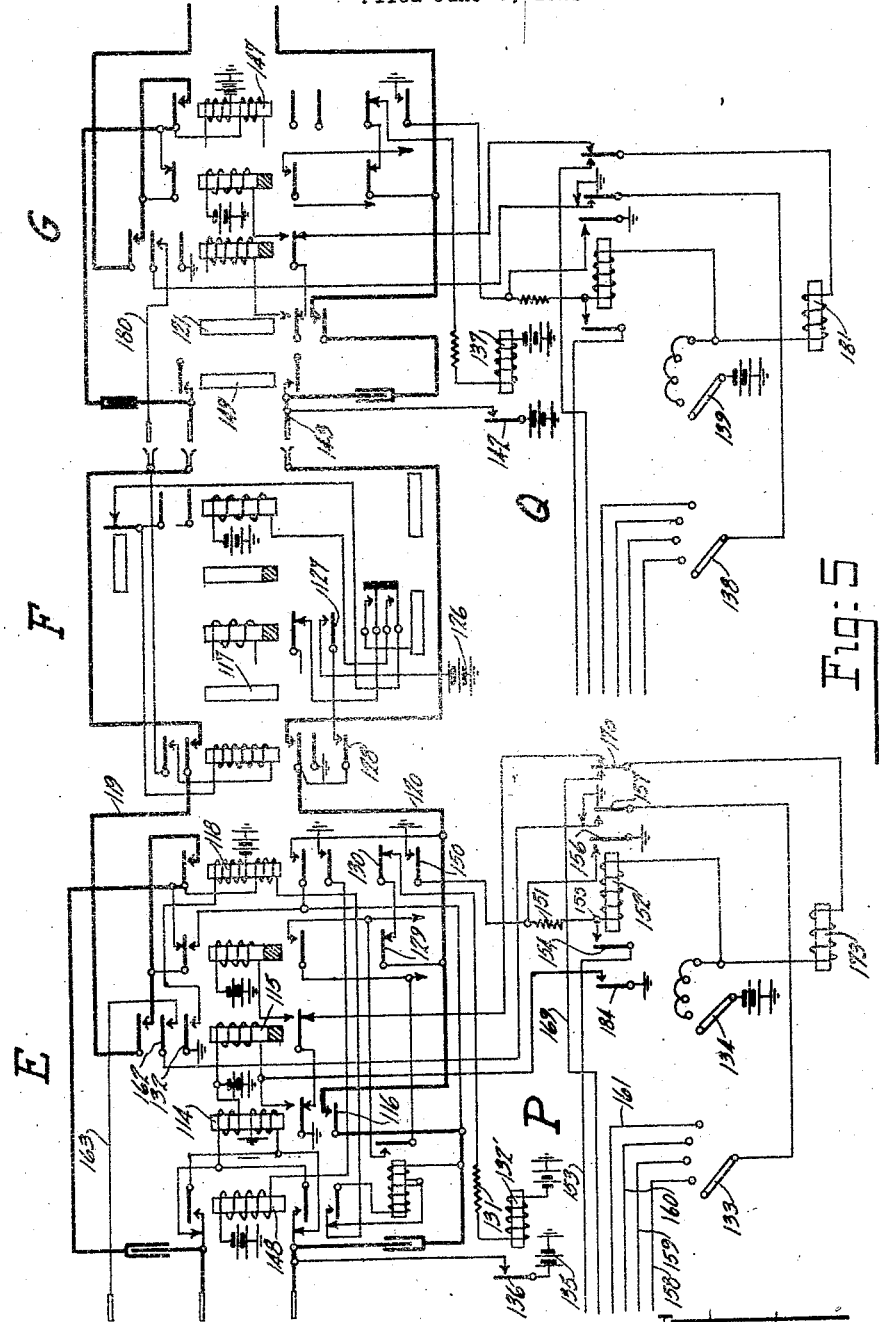

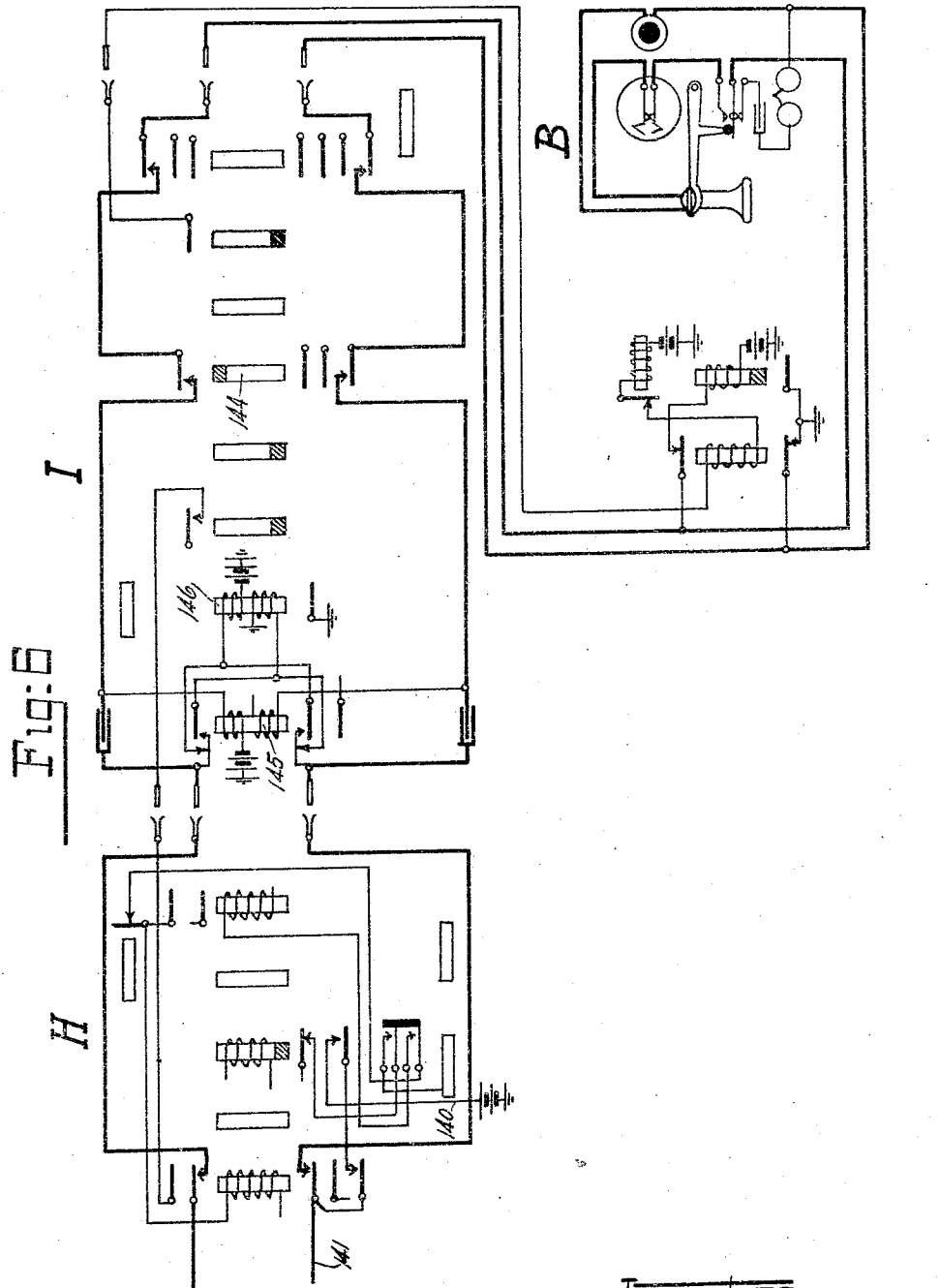

1,550,666

UNITED STATES PATENT OFFICE.

PHILIP THOMAS BATES, OF BUENOS AIRES, ARGENTINA, AND RICHARD MERCER AND CHARLES GILLINGS, OF LIVERPOOL, ENGLAND, ASSIGNORS TO AUTOMATIC ELECTRIC COMPANY, OF CHICAGO, ILLINOIS, A CORPORATION OF ILLINOIS.

ZONE METERING SYSTEM.

Application filed June 9, 1921. Serial No. 476,330.

*To all whom it may concern:*

Be it known that we, PHILIP THOMAS BATES, RICHARD MERCER, and CHARLES GILLINGS, subjects of the King of Great Britain and Ireland, and residents of Buenos Aires, Argentina, South America, Liverpool, England, and Liverpool, England, respectively, have invented certain new and useful Improvements in Zone Metering Systems, of which the following is a specification.

The present invention relates to improvements in or relating to telephone or like systems. In such systems it is often desirable to generate a definite number of impulses (one or more) to perform certain operations incidental to a connection. For instance, to charge subscribers' different rates for different connections one would require to operate the meter a variable number of times dependent on the particular connection set up, and it is the object of the invention to enable such impulses to be produced in a cheap and economical manner, by arranging that a considerable portion of the apparatus used is common to a number of connections and possibly to the whole exchange, every impulse being complete and of sufficient duration to perform the operation for which it is rendered effective.

According to the present invention a definite number of impulses transmitted from an impulse generating device are rendered effective to control an operation individual to a connection by the co-operation of separate and distinct controlling means, one of which means may be individual to the connection while the other means is common to a number of connections and possibly to the whole exchange. Preferably the impulses are generated in cycles in continuous succession, each cycle consisting of the desired number of impulses, and any complete cycle being adapted to be made effective to perform an operation incidental to a connection. Such cycles of impulses would be preferably preceded by a distinctive impulse to render such cycle effective and succeeded by a second distinctive impulse to prevent subsequent cycles being effective to perform the same operation; that is to say, it is desirable to operate a meter one, two, or three times, and not to repeat the operation during the conversation or at least for some time during which a number of other cycles are being generated.

A further feature of the invention is an arrangement whereby booster impulses are arranged to be substituted for earth on a common lead to operate the meters in connection with a number of separate and distinct conversations which may take place simultaneously.

The invention will be described with relation to an automatic telephone system although it will be understood that it is equally applicable to other telephone systems. The invention is also described with relation to metering although it should be understood that the invention is equally applicable for other purposes in which an operation has to be performed by a definite number of impulses. For instance, it may be applied to the operation of coin boxes, or for sending signals consisting of a definite number of impulses over a line for operating switches or for operating mechanisms or for operating subscribers' local meters.

Referring to the drawings, Figure 1 shows the application of the invention to assessing a charge in an automatic telephone station in accordance with the junction line taken into use. Figure 2 and Figure 3, respectively, show applications of the invention to enabling metering to be effected at the end of the conversation and at the commencement of the conversation but without interfering or interrupting it in any way. Figs. 4, 5, and 6 show an arrangement for charging for a call in accordance with the trunk lines taken into use in serial relationship. Fig. 7 shows an alternative arrangement to Fig. 8 for use in connection with Figs. 4 and 5 for producing the variable number of booster battery impulses.

Referring to Fig. 1, cams 2, 3 and 4 mounted on a common shaft (not shown) are arranged to operate contact springs 5, 6, and 7, respectively. The shaft upon which the cams are mounted is preferably driven at a fixed speed and the projecting parts of the cams 2, 3 and 4 are arranged to operate the contact springs 5, 6, and 7 in continuous cycles as follows: Firstly, the cam 2 operates the contact springs 5. At this time it will be seen that there is also an earth connection on the lead 9 as the contact springs 6 are not operated. Immediately after springs 5 break contact the cam 3 operates the springs 6 so that earth is removed from the lead 9 and is replaced, firstly by battery through the resistance R, which resistance is immediately short circuited when the contact springs 6 are fully operated, so that battery is connected direct to the lead 9. It will be noted that this battery connection is such as to prevent there being at any time a definite break with the lead 9, while at the same time preventing the battery being short circuited. Springs 6 are operated only for a short interval, after which earth is replaced on the lead 9 by the reverse process and remains thereon for another short interval until the springs 6 are again operated and battery is again placed on the lead 9, which at the end of a further period is again replaced by earth. Shortly after the close of this period, the cam 4 operates the springs 7 so that earth is placed on the lead 10. The cycle then recommences with the operation of the springs 5 and so continues for the generation of two further impulses of battery to the lead 9, followed by the operation of the springs 7 to apply ground to the lead 10. This arrangement is preferably provided common to the exchange and is used for the purpose of operating the meters which require to be operated twice for a connection. For other charges the cycles will be such that the impulses generated by cams 2 and 4, which will in the future be referred to as the start and stop impulses, respectively, will occur at the beginning and end of one, three or more impulses as may be desired.

The arrangement by which such impulses may be made effective to operate a meter for any particular connection will now be described.

In the lower part of Fig. 1 is shown the circuit connections of repeater E which is of a type well known in automatic telephone systems modified to suit the present invention. Such repeaters as is well known are individual to a junction or trunk line and, therefore, form a convenient means whereby the charging for a particular connection may be assessed. On connection being established with the repeater a circuit will be closed across the lines 11, 12 so that the relay 13 will operate through the contacts controlled by armatures 14 and 15 of the reversing relay 16. The relay 13 on energizing closes a circuit for the release relay 17 which energizes and at its armature 18 prepares a circuit for the relay 19, while at its armature 20 it connects earth back to the release trunk conductor 21 through the springs controlled by armature 34 to maintain those switches taken into use prior to the repeater E in the operated condition. At its armature 22, the circuit of the lower winding of the electro polarized relay 23 is closed. Prior to this, however, at armature 23[A] a circuit had been closed across the trunk conductors 24 and 25 through the upper winding of the relay 23, impedance 26 and armature 23[A] and its working contact. Neither of these windings by themselves are sufficient to energize the relay 23 which is only energized when the two windings assist each other, at this stage they do not, so that relay 23 remains unoperated. The calling party then commences to operate his impulse sender to effect the completion of the desired connection, relay 13 in consequence responds thereto and at its armature 23[A] opens the circuit of the line relay of the switch ahead, while at its armature 27 it completes a circuit for the relay 19 which at its armature 28 opens the bridge extending through the impedance coil 26 and the upper winding of relay 23 and completes a direct bridge across the conductors 24 and 25 so that the efficiency of the dialling circuit is increased. This operation continues until the calling party has established connection with the line of the party called when, if the line is free the called party will be rung and on his reply the current over the trunk lines 24 and 25 will be reversed thereby effecting the operation of the relay 23. The relay 23 on energizing at its armature 29 connects the start lead 8 to the relay 16 which energizes as soon as the springs 5 are operated because earth at that instant is connected to the lead 8. The relay 16 on energizing at armatures 14 and 15 reverses the connection of the relay 13 to the lines 11 and 12 so that supervisory signals or the like may be operated, while at armature 30 it closes a locking circuit for itself through its own armature 30 and through armature 31 of the polarized relay 23 to earth, while a branch of this circuit extends through armature 32 of relay 33 to earth on armature 20. At armature 34 the lead 9 is connected direct to the release conductor 21. As previously described this is very shortly afterwards followed by booster impulses which are thereby connected to the lead 21 and are adapted to operate a meter connected thereto in known manner. In the case shown the meter would be operated twice.

It will be understood that the battery connected to the lead 9 is termed booster battery because it assists the battery which was normally holding various relays in the operated condition to the release trunk as is well known.

Shortly after the meter has been operated twice by the two booster battery impulses, earth is connected to the lead 10. Consequently a circuit is closed through the armature 35 of relay 16 when relay 33 therefore energizes and at its armature 32 locks itself energized to earth at armature 20. Relay 33 at its armature 36 disconnects the impulse lead 9 so that this is ineffective for the remainder of the connection, and reconnects the release trunk conductor 21 with earth on the armature 20 of relay 17.

It will thus be appreciated that the subscriber's meter has been operated a number of times appropriate to the connection. Now in view of booster battery being connected direct to the lead 9 for certain periods, it is important that both the connection and disconnection of the lead 9 must take place in such a manner as to avoid a direct short circuit on the battery, while at the same time ensuring that there is a continuous earth or its equivalent booster battery to maintain all the holding relays of the preceding switches to the repeater E energized.

Normally, it has been usual to provide a resistance in series with the booster battery but in view of the necessity of having a common lead 9 whereby booster battery impulses may be connected to a number of connections simultaneously, such a resistance becomes impracticable.

It will be appreciated that by arranging the start and stop impulses at the correct period with relation to the booster impulses, there has been no possibility of booster battery being short circuited while at the same time an uninterrupted connection of earth or booster battery has been applied to the conductor 21. The arrangement for safeguarding this during the release of a connection will now be described.

The release of the repeater E is effected by the calling subscriber removing the closed circuit across the lines 11 and 12 whereby the relay 13 was maintained energized. Relay 13, therefore falls away, momentarily energizing the relay 19 due to the relay 17 being somewhat slow to release. Relay 17 after a short while falls away and removes earth from its armatures 20 and 22. Relay 23 falls away immediately but due to relay 19 being energized for a short time after the release of relay 17, earth removed by armature 20 is replaced by earth on armature 38, so that relay 33 remains energized. Relay 23 on deenergizing disconnects the start lead 8 from the armature 29 so that the relay 16 cannot be energized again from this source, and further, at armature 31 breaks the locking circuit of relay 16 which deenergizes and at armature 34 re-connects the lead 21 to earth on the armature 38. On the deenergization of relay 19 this earth is removed and relay 33 is deenergized so that at this time all relays are restored to normal and the preceding switches in the connection are released.

It will thus be appreciated that a very convenient and simple means for introducing a metering impulse to a telephone circuit at the commencement of a conversation has been evolved, and by this means it is readily possible to make differential charging for various junctions taken into use involving very simple and inexpensive apparatus.

It will be understood, however, that the invention is equally applicable to supplying single or more metering impulses at a connector switch and this may be effected either at the end of a conversation or at the commencement so as not to interfere in any way with the conversation.

The arrangements shown in Figs. 2 and 3 illustrate the application of the invention to connectors to effect registering either at the end or at the beginning of a conversation respectively, without employing any relays other than those already used for other purposes.

Fig. 3 will be described first as in that figure all the relays and other apparatus incidental to a connector switch are shown in full so that the operation of Fig. 2 may be referred thereto as this latter figure simply shows the relays which are pertinent to the functioning of the invention.

In Fig. 3, the operation of the connector switch up to the time of the metering will only be briefly described as this is well known. The relay 40 responds to the closure of the circuit across the conductors 41 and 42 and causes the release relay 43 to energize which relay connects earth back to the release trunk at armature 44 from the contact springs controlled by armature 45 of relay 46. At the same time a circuit is closed in the usual manner by armature 47 through the off normal springs so that on the dialling of the next to last set of impulses for the connection, the vertical magnet 48 and series relay 49 are energized in series, the vertical magnet stepping the switch up to the desired level. The off normal springs 50 and relay 49 by their mutual cooperation enable the vertical magnet to respond to the initial set of impulses and the rotary magnet 52 to respond to the subsequent series of impulses. On the completion of this series of impulses, if the line is busy the relay 46 is energized thereby connecting a busy tone from lead 67 back to line 42, this relay locking itself energized to earth on armature 66 so that the busy tone is continued until the subscriber hangs up. In this case no metering is effected as the earth on the release trunk conductor 53 is replaced by earth on the armature 54 of relay 55 controlled by the ringing trip relay 57 when relay 46 is energized, the ringing trip relay of course does not respond and therefore the relay 55 is not energized when the called party does not reply. As the booster impulses are led over the lead 9 in the same manner as described with reference to Fig. 1, it will be appreciated that unless the armature 54 is attracted, no booster impulses are connected in operative relationship to the connector switch. If, however, the called subscriber's line is idle, the wiper relay 56 energizes in the usual way and connects ringing current over the called subscriber's loop and through the upper winding of the ringing trip relay 57. This relay responds as soon as the called party lifts his receiver but not before and brings into circuit the back bridge relay 58 which energizes and at its armature 59 connects the start impulse lead 8 through the back contact of armature 60 of relay 61, front contact of armature 62 of relay 56, relay 46 to battery. Relay 46, therefore, energizes just prior to the connection of booster battery to the lead 9. Immediately relay 46 energizes the lead 9 which has been extended by the energization of the ringing trip relay 57 and the consequent energization of relay 55 to armature 45 of the busy relay 46 is extended through the armature 44 of relay 43 to the release trunk conductor 53 so that booster impulses coming on the lead 9 are effective to operate a meter connected to said release trunk conductor. On the completion of booster impulses earth is connected to the lead 10 through the working contact of armature 63 of relay 55, working contact of armature 64 of relay 46, relay 61 to battery. Relay 61 energizes and at its armature 60 disconnects the locking circuit of the relay 46 so that this relay deenergizes and replaces earth on the release trunk conductor, the lead 9 being connected to the armature 45 is thereby disconnected so that the booster impulses cannot again be effective to operate the meter. It will be appreciated that the relay 46 cannot be energized again by the starting impulses on the lead 8 owing to the armature 60 being open, the relay 61 being locked energized through armature 68, armature 66 of relay 43 to earth. On the release of the connection, the deenergization of relay 55 follows on the deenergization of the ringing trip relay, while the release of relay 61 takes place at approximately the same time, the wiper relay 56 having deenergized somewhat previously so that in no circumstance is it possible to reenergize relay 46 and a repetition of the metering on the release is effectively prevented.

In Fig. 2 only the relays 40, 43, 46, 56, 55, 58 and 61 are reproduced as these are the only relays which are affected by the invention. It will be assumed first of all that the wanted party has not replied either because he is busy or for other reasons. In such a case, the calling party will hang up and the release relay will deenergize thereby closing a circuit for the release magnet at the back contact of armature 70, back contact of armature 71', off normal springs 82, release magnet 83 to battery, so that the connection is immediately released without metering taking place. On the other hand, if the wanted subscriber replies, then the relays 55 and 58 will be energized. The relay 58 may deenergize before the release relay 43 has deenergized, due to the wanted party hanging up his receiver first and as the back bridge relay is the only sure means present in the ordinary type of connectors by which one can ascertain whether the wanted party has replied or not, it is utilized to operate the relay 61. The back bridge relay on energizing causes the relay 61 also to energize which relay locks itself energized through armature 71 of relay 55 and its working contact and through armature 70 so that the further operation is independent of whether the back bridge relay deenergizes first or last as in any case, it will deenergize immediately after the ring cut off relay is deenergized as will be appreciated from Figure 3.

On the release of a completed connection, the relay 43 deenergizes and connects the release trunk conductor 72 via the springs controlled by armature 73, springs controlled by armature 84 to earth at armature 70 so that the selectors and other switches are held in the operated position. At the springs controlled by armature 74 a lead 75 is connected to the conductor 78 via the armature 77 and its working contact. This lead 75 differs from the lead 8 previously described in that instead of a momentary earth being connected to it immediately prior to the generation of impulses, earth is removed from it at this instant, otherwise, earth is normally connected to it. This may be effected by reversing the relationship of the contact springs 5 as will be appreciated by referring to Figure 1. The consequence is that the locking circuit for the wiper relay 56 is not broken immediately after the release of the relay 43 due to earth being replaced from the lead 75 until the correct instant in the cycle, when earth is momentarily removed from lead 75. Relay 56, therefore, deenergizes and at its armature 77' connects earth via armature 78' and its working contact to relay 46 which energizes and completes a circuit for the booster lead 9 to the release trunk conductor 72 via the off normal springs 79, armature 80 and its working contact, armature 84 and its working contact, contact springs controlled by armature 73 to release trunk conductor 72 thereby effecting the operation of the meter an appropriate number of times. On the completion of the booster impulses, a stop impulse is placed as before described on the lead 10 which is connected through armature 81, back contact of armature 71',
off normal springs 82 to the release magnet 83. The release magnet 83 thereupon energizes and the switch is restored to normal, the relay 55 deenergizing as soon as the off normal springs 79 open due to earth being thereby removed from the release trunk conductor. The release of relay 55 is immediately followed by the release of relays 61 and 46 thereby effectually preventing any further operation of the meter and avoiding any danger, due to the off normal springs 79 being first broken of earth being connected to the booster lead during the generation of impulses.

In Figs. 4, 5, and 6, an arrangement is shown whereby metering may be varied in accordance with the number of trunk lines in serial relationship taken into use. It will be assumed that a connection is established from a subscriber at substation A through a line switch C and a selector D at his local exchange via a repeater E, through trunk lines 119 and 120 to a selector F in a second exchange, thence through a second repeater G to a selector H in a third exchange, through the connector I to a subscriber B at that exchange.

The origination of a call at the substation A proceeds in the well known manner, that is to say, the line relay 100 responds to the lifting of the receiver and arranges that either the rotary magnet 101 or the cut-off relay 102 is energized according as to whether the line on which the wipers of the line switch are resting is engaged or idle, so that the wipers are stepped around until an idle line is found, say that leading to selector D. The cut off relay 102 is then operated to connect the subscribers' lines through to the selector D thereby causing the energization of the line relay 103 which is followed by the energization of release relay 104. On the subscriber dialling, series relay 105 and vertical magnet 106 are energized in response to the impulses and step the wipers up to the required level. On the deenergization of relay 105 an initial impulse is given to the rotary magnet 107 by means of the rotary interrupter relay 108 and the subsequent operation depends upon whether the first trunk line on the level selected is idle or otherwise, the relay 108 or the relay 110 being energized according as to whether the line is busy or free respectively. The relay 108 causes the intermittent energization of rotary magnet 107 until an idle line is found when the relay 110 is energized and extends the subscriber's leads through to the wipers 111 and 112 and also extends the release trunk conductor through to wiper 113.

It will be assumed that the repeater E had been connected with, so that the line relay 114 of this repeater is immediately energized. This is followed by the energization of the holding relay 115 and in response to subsequent impulses dialled by the subscriber at substation A, the impulses are repeated by armature 116 to effect the operation of line relay 117 of selector F this selector is only shown diagrammatically as it is in substance identical with selector D and only those parts essential for an understanding of the present invention are shown in full.

It should be mentioned, that at the repeater E an electro polarized relay 118 is provided having two windings one of which is connected across the trunk lines 119 and 120 being fed with battery through the relay 117 originally, and eventually through relay 121 of repeater G, while the other winding is connected direct between battery and earth on the armature 132 of relay 115. These two windings are arranged so that neither individually is capable of energizing the relay 118 nor if they are in opposition, which is the condition at this period of the setting up of the connection, but if the two assist each other, then the relay 118 will respond, this relay being provided for the purpose of indicating when the called party has answered due to reversal of current on the line causing it to energize. The connection then proceeds via selector F and repeater G in identical manner as through the selector D and repeater E. The selector H is similar in every respect to the selectors D and F and operates in response to the third series of impulses, while the connector I responds to the last two series of impulses and is of standard construction being somewhat similar to that shown in Figure 3. Selectors D, F and H differ from the normal type of selector in that they have additional armatures connected to the release relay and to the switching relay respectively.

Referring to selector D it will be noted that when relay 110 is energized and for the short interval which elapses after this event, before the relay 104 releases, battery 123 is connected via armatures 124 and 125 to the lower trunk conductor. As selector D is at the originating exchange this is of no effect. At selector F, however, when the second series of impulses is completed, a circuit may be traced as follows:—Booster battery 126, armature 127, armature 128, trunk conductor 120, armature 129 and its resting contact, armature 130 and its resting contact, resistance 131, magnet 132' to main battery and earth. Magnet 132' energizes and steps the arms 133 and 134 of a rotary switch one step from the normal position. At the same time, battery 135 is connected via armature 136 to the lower trunk conductor. This is again without effect at this exchange. The rotary magnet 137 of the step by step switch Q is similarly caused to advance the arms 138 and 139 one step due to battery 140 being connected to the lower trunk conductor 141 at the end of the third series of impulses similar to that described with reference to selectors D and F, the energization of magnet 137 causes its armature 142 to connect battery to the lower trunk conductor 143 and thence to the lower trunk conductor 120, armature 129, armature 130, resistance 131, magnet 132 to cause said magnet 132 to advance the arms 133 and 134 a second step. If there had been any further serially related exchanges, then the arms 133 and 134 would have been advanced to a third or fourth step as the case may be.

It will be understood that the switch Q will have been advanced one less step than the switch P. Incidentally, any other similar switches associated with repeaters connected to other trunk lines taken into use will be advanced one less step than the preceding ones. However, the switch P is the only one which is effective as will be appreciated from the following description.

When the connection is established and the called party at station B lifts his receiver from the hook, the ringing trip relay 144 is energized and is followed by the energization of the back bridge relay 145 which reverses the current fed out through the windings of the line relay 146 of the connector thereby causing the relay 147 of the repeater G to energize. This relay is identical in action with the relay 118 of repeater E, by referring to which it will be noted that the reversing relay 148 will be energized thereby, this corresponds to the relay 149 in repeater G.

The reversal of current by the relay 149 causes the energization of relay 118 which as described causes the energization of relay 148. This reversal serves to operate supervisory signals or the like. Relay 118 at armature 130 opens the circuit of magnet 132, while at armature 150 it connects earth through resistance 151 to the relay 152 and thence through the bank contact of rotary switch P on which arm 134 is resting, to battery. Relay 152, therefore, is energized but only sufficient to connect the lead 153 via the armature 154 to the junction point 155 of the resistance 151 with the winding of the relay 152. Nothing further can happen until earth is placed on the lead 153 when the relay 152 will immediately pull up fully. This occurs in a particular instant in the cycle of impulses as will be described later. On the relay 152 completely energizing, a locking circuit for itself is established via armature 156 and resistance 151, the current through this circuit being sufficient to maintain the relay 152 continuously energized, although not sufficient to operate it. It will be noted that armature 157 is connected by the arm 133 to a particular one of the leads 158, 159, 160, and 161 according to the number of steps made by the rotary switch P, that is to say, in accordance with the number of junction lines taken into use and according to the charge which is to be made therefor. As the relay 152 energizes in a particular portion of the cycle the booster impulses do not commence until the armature 157 is fully operated and connected to the armature 162 of relay 115 and thence to the release trunk conductor 163. This release trunk conductor, it will be seen, extends through the switch bank contact with which wiper 113 is engaging and thence through the working contact of armature 164 to the bank contact 165, wiper 166 of rotary switch C, armature 167, meter 168 to battery. The meter operates in accordance with the number of impulses sent therethrough, which as will be explained later is determined by the particular lead of the leads 158, 159, 160 and 161 with which the arm 133 is in engagement. Shortly after the impulses have ceased, an earth impulse is received over the lead 169 through the armature 170 to the release magnet 173 and thence through the arm 134 to battery. The release magnet therefore energizes and everything is restored to normal so that no further charging can take place during the conversation.

Referring to the arrangement for supplying impulses to the leads 158, 159, 160 and 161, this is shown at Fig. 7, Figs. 4 and 5 requiring to be placed in alignment with Figure 5 to the right of Figures 4 and 7. In place of the cams shown in Fig. 1, six cams are provided, cam 174 serving to connect an earth impulse to the lead 153 at the beginning of every cycle, cam 175 is adapted to connect an earth impulse to the lead 169 at the end of every cycle, while cams 176, 177, 178 and 179 are adapted to send either four impulses, three impulses, two impulses, or one impulse in the period between the operation effected by cam 174 and the operation effected by cam 175. Consequently, the meter will be operated a variable number of times according to which lead of the leads 158, 159, 160 and 161 is selected by the rotary switch P.

A similar action would take place at the rotary switch Q and metering impulses would be transmitted over the release trunk conductor 180. As however, this conductor does not extend beyond the selector F, these impulses are without effect and simply enable the release magnet 181 to be operated to restore the switch Q to normal.

As it might happen that for high charges conversations occur in less than the time required for effecting the metering, a locking circuit is provided for retaining the relay 115 energized until the metering is completed. This circuit extends from the winding of relay 115 to the working contact of armature 184 of relay 152 although this may not be required.

In Fig. 8 an alternative arrangement for generating the impulses is shown which has the advantage that the time required to elapse before the metering is completed is less when there are less metering impulses to be utilized. In this case which will be described with reference to Fig. 8, there is only one cam 190 generating booster impulses, while 8 other cams 191–198 are provided for generating start and stop impulses at appropriate times. For instance, referring to Figure 8, it will be noted that cam 191 generates four starting impulses in a revolution, and cam 192 generates four stop impulses, while four booster impulses are generated by cam 190. The consequence is that the time required to elapse before the metering is effected for one impulse, is considerably less than would be the case in the arrangement shown in Figure 7. Only two start impulses are generated by cam 193 and two stop impulses are generated by cam 194, so that two complete cycles of two impulses are generated while cam 190 makes a complete revolution. The start impulses generated by cams 195 and 197 are identical and could be replaced if desired by one cam only but are shown in the present arrangement for convenience. The operation is as follows:—A switch P has its bank contacts connected to the springs controlled by the various start and stop cams instead of as in Fig. 5, so that booster impulses are connected direct to armature 200 of relay 201 which is similar in every respect to relay 152. When the electro polarized relay 118 energizes, a circuit is closed for relay 201, through resistance 202 sufficient to energize this relay partially, so that the armature 203 alone makes contact. The full operation of relay 201 will depend upon the first start impulse which is received over arm 134, which of course will depend upon whether one impulse, two impulses, three impulses or four impulses are to be registered, that is to say, it will depend upon the position of the switch arms 133 and 134.

As soon as the start impulse is received, relay 201 is fully energized and armature 200 is connected through to armature 162 and thence to the release trunk conductor 163 as previously described. Consequently, a meter is operated once, twice, three times or four times according as to when a stop impulse is received over arm 133. When this occurs, a relay 204 is operated and breaks a locking circuit of relay 201 which had existed through the back contact of armature 205 and armature 206 and its working contact through resistance 202, relay 201 to battery, the conditions being substantially identical with that previously described with relation to relay 152. Simultaneously with the energization of relay 204, the stop impulse through armature 207 had also effected the operation of the release magnet 173 whereby the arms of the rotary switch P are restored to normal.

Having now particularly described and ascertained the nature of our said invention and in what manner the same is to be performed, we declare that what we claim is:—

1. In a measured service telephone system, an automatic switch, a group of link circuits terminating in the bank of said switch, means whereby a calling party can operate said switch to select an idle link circuit and extend a connection thereover to a called line, a constantly operating meter control device common to said link circuits, constantly operating starting and stopping devices common to said link circuits, and means in the link circuit in use controlled by the two last mentioned devices for rendering the meter control device effective to actuate the calling subscriber's meter to assess a correct charge for the call.

2. In a measured service telephone system, an automatic switch, a group of link circuits terminating in the bank of said switch, means whereby a calling party can operate said switch to select an idle link circuit and extend a connection thereover to a called line, a constantly operating meter control device common to said link circuits, constantly operating starting and stopping devices timed with respect to said control device and also common to said link circuits, and means in the link circuit in use controlled by said two last mentioned devices for rendering the meter control device effective for a definite time to actuate the calling subscriber's meter.

3. In a measured service telephone system, an automatic switch, a group of link circuits terminating in the bank of said switch, means whereby a calling party can operate said switch to select an idle link circuit and extend a connection thereover to a called line, a start conductor, a meter operating conductor, a stop conductor, all of said conductors being common to said link circuits, means for periodically grounding said conductors in the order named, and means in the link circuit in use controlled over said start and stop conductors for causing the calling subscriber's meter to respond to the grounding of the operating conductor to charge for the call.

4. In a measured service telephone system, an automatic switch, a group of link circuits terminating in the bank of said switch, means whereby a calling party can operate said switch to select an idle link circuit and extend a connection thereover to a called line, a start conductor, a meter operating conductor, a stop conductor, all of said conductors being common to said link circuits, constantly operating means for periodically transmitting impulses over said conductors, each impulse over the start conductor being followed by a plurality of impulses over the operating conductor and an impulse over the stop conductor, and means in the link circuit in use controlled over said start and stop conductors for causing the calling subscriber's meter to respond to only a single series of impulses transmitted over the operating conductor.

5. In a measured service telephone system, a meter controlling device common to a plurality of lines comprising an operating conductor, a start conductor, a stop conductor, and continuously operating means for periodically placing potentials on said conductors, means controlled over the start conductor for rendering the operating conductor effective to control a subscriber's meter, and means controlled over the stop conductor for rendering the operating conductor ineffective.

6. In a measured service telephone system, a plurality of link circuits for connecting subscribers' lines, only one of said link circuits being used in any particular connection, a meter controlling device common to said link circuits and comprising a start conductor, a stop conductor, an operating conductor and means for periodically placing potentials on said conductors, means in each link circuit controlled over said start conductor when the link circuit is in use for rendering said operating conductor effective to actuate the calling subscriber's meter, and means in each link circuit controlled over the stop conductor for rendering the operating conductor ineffective.

7. In a measured service telephone system, a series of automatic switches for connecting a calling and a called line, a meter for the calling line, a meter controlling device comprising an operating conductor, start and stop conductors, and means for periodically placing potentials on said conductors, a meter control circuit extending through one of said switches, means controlled over said start conductor for connecting the meter control circuit with said operating conductor to actuate the meter, and means controlled over said stop conductor for disconnecting the operating conductor and control circuit.

8. In a measured service telephone system, a series of automatic switches for connecting a calling and a called line, a meter for the calling line, a meter controlling device comprising a plurality of operating conductors, start and stop conductors, and means for periodically placing potentials on said conductors, a meter control circuit extending through one of said switches, an auxiliary switch actuated during the establishment of the connection for selecting one of said operating conductors, means controlled over said start conductor for connecting the meter control circuit to the selected operating conductor to actuate the meter, and means controlled over said stop conductor for releasing said auxiliary switch.

9. In a telephone system, lines, trunk lines, automatic switches for completing connections between said lines via said trunk lines, meters for said first named lines, meter controlling mechanism for operating a meter of any one of said lines a variable number of times for each successful call dependent on the number of trunks used, said meter controlling mechanism being common to said trunk lines and adapted for use in controlling any number of meters at one time.

10. In a telephone system, lines, trunk lines, automatic switches for connecting said lines via one of said trunk lines, meters individual to said first named lines for registering variable charges, continuous operating meter controlling mechanism common to said trunks, means individual to each trunk for connecting said mechanism to cause the operation of the meter of a calling line a predetermined number of times, and means individual to said trunk for disconnecting said mechanism after the meter has been operated the required number of times.

11. In a telpehone system, a line, a trunk line, means including automatic switches for extending a connection to a called line via said trunk line, a meter, a circuit for maintaining said automatic switches operated and also including said meter, a conductor adapted to be connected in said circuit, means common to the exchange effective when a connection is completed for periodically varying the strength of current flow in said conductor to operate said meter, and means in said trunk for causing the current value to be maintained constant after the meter has been operated a predetermined number of times.

12. In a telephone system, lines, trunk lines, means including automatic switches for connecting a calling one of said lines via one of said trunk lines, a meter for the calling line, meter controlling mechanism common to the exchange, common conductors terminating in said mechanism and having branches extending to the various trunk lines, means in said trunks controlled over certain of said conductors for causing the meter of the calling line to be operated at intervals, and means in said trunk operated over another of said conductors for disconnecting said meter from its operating circuit after it has been operated the required number of times.

13. In a measured service telephone system, a subscriber's line, a meter and line switch for said line, trunk lines, means including said line switch and one of said trunk lines for extending a connection to a called line, means individual to the trunk line taken for use for supplying current to said automatic switch to maintain the same operated, a constantly operating meter control device common to said trunk lines, constantly operating starting and stopping devices timed with respect to said control device and also common to said trunk lines and means in the trunk taken for use for rendering said meter starting, operating, and stopping devices effective in the order named.

14. In a measured service telephone system, a meter, a constantly operating device common to the exchange for transmitting impulses to said meter, a relay for rendering said meter operating device effective, a constantly operating starting device for causing the energization of said relay, a relay for rendering said meter operating device ineffective, and a constantly operating device for causing the operation of said last mentioned relay.

15. In a measured service telephone system, an automatic switch, a holding circuit containing a source of current for maintaining said switch operated, a meter included in said circuit not affected by the current required for maintaining the switch operated, constantly operating devices common to the exchange, and means for rendering said devices effective to vary the strength of current flow over the holding conductor a predetermined number of times to operate said meter and for then causing the current supply over the holding circuit to remain constant.

16. In a measured service telephone system, an established connection, a holding circuit including a source of current for maintaining said connection intact, a meter included in said holding circuit not affected by said holding current, a resistance element, a source of booster current, and means for connecting said booster current to said circuit via said resistance and for then removing said resistance from said circuit to increase the current flow sufficiently to operate said meter.

17. In a measured service telephone system, an established connection, a holding circuit including a source of current for maintaining said connection intact, a meter included in said holding circuit not affected by said holding current, a resistance element, a source of booster current, and means for connecting said booster current to said circuit via said resistance and for then removing said resistance from said circuit to increase the current flow sufficiently to operate said meter while maintaining the continuity of the current flow for maintaining the connection intact.

18. In a telephone system a calling and called line, a preselector terminating the calling line having access to selectors and a connector forming a temporary connective train between the calling and the called lines, an impulse register specific to the calling line for integrating the number of impulses applied to it, an impulse sending means common to a plurality of like said coincident connections, and means responsive to an answer from the called line for applying the impulse sending means operative to the impulse register and for then disconnecting it for the duration of the call.

19. In a telephone system a calling and a called line, a pre-selector terminating the calling line having access to selectors and connectors forming a temporary connective train between the calling and the called lines, an impulse register specific to the calling line for integrating the number of impulses applied to it, an impulse sending means common to a plurality of like said coincident connections, means responsive to an answer from the called line for operatively applying the impulse sending means to the impulse register, and means for disassociating the impulse sending means for the duration of the call after a series of impulses has been operatively applied to the impulse register.

20. In a telephone system, a plurality of pairs of connected calling and called telephone lines, a call toll register for the calling line of each pair, a device common to all the call registers for projecting a train of impulses operatively effective to the respective said registers coincidently, and means independently controlled over the respective called lines of the pairs for causing only the register on its respective paired line to be effectively operated.

21. In a telephone system, a plurality of calling lines, a toll meter companion to each calling line respectively, called lines to which the respective calling lines are temporarily connected, a periodically operating mechanism common to the calling line meters for sending an impulse train at each operation, means controlled over a connected called line for causing the said mechanism to apply its next succeeding train of impulses to the meter of the respective companion calling line, means automatically controlled by the said mechanism for preventing more than one train to be applied effective to a specific meter during a sustained connection of its companion calling line, and means whereby the said mechanism may commonly serve a plurality of coincident said connections without affecting its normal operation with respect to any said connection.

22. In a telephone system, a plurality of calling lines, a toll meter companion to each calling line respectively, called lines to which the respective calling lines are temporarily connected, a periodically operating mechanism common to the calling line meters for sending an impulse train at each operation, means controlled over a connected called line for causing the said mechanism to apply its next succeeding train of impulses to the meter of the respective companion calling line, and means automatically controlled by the said mechanism for preventing more than one train to be applied effective to a specific meter during a sustained connection of its companion calling line.

23. In a telephone system, a calling line, a toll meter companion to the calling line, a called line, the calling and called line being temporarily connected, a periodically operating mechanism for sending an impulse train at each operation, means controlled over the called line for causing the said mechanism to apply its next succeeding train of impulses to the toll meter, and means automatically controlled by the said mechanism for preventing more than one train to be applied effective to the toll meter during a sustained connection.

24. In a telephone system, a calling line, a toll meter companion to the calling line, a called line, the calling and called line being temporarily connected, a periodically operating mechanism for sending an impulse train at each operation, means controlled over the called line for causing the said mechanism to apply its next succeeding train of impulses to the toll meter, means for preventing less than a complete train being applied effective to the toll meter, and means automatically controlled by the said mechanism for preventing more than one train to be applied effective to the toll meter during a sustained connection.

25. In a telephone system, a calling line, a toll meter companion to the calling line, a called line, the calling and called line being temporarily connected, a periodically operating mechanism for sending an impulse train at each operation, means controlled over the called line for causing the said mechanism to apply its next succeeding train of impulses to the toll meter, and means for preventing less than a complete train being applied effective to the toll meter.

26. In a telephone system, a calling line, a toll meter companion to the calling line, a called line, the calling and called line being temporarily connected, another calling and called line like connection, a periodically operating mechanism common to the said connections for sending an impulse train at each operation, means controlled over a called said line for causing the said mechanism to apply its next succeeding train of impulses to the toll meter of the companion calling line of the last said called line, and means for preventing less than a complete train being applied effective to the toll meter.

Signed by me at Buenos Aires, Argentina, this 2nd day of May, 1921.

PHILIP THOMAS BATES.

Signed by us at Liverpool, England, this 17th day of March, 1921.

RICHARD MERCER.
CHARLES GILLINGS.